(12) United States Patent
Zhu et al.

(10) Patent No.: US 12,090,422 B2
(45) Date of Patent: Sep. 17, 2024

(54) DEVICE FOR REMOVING BUBBLES IN DRIP ADHESIVE

(71) Applicant: Shenzhen Jiaguo Technology Co., Ltd., Shenzhen (CN)

(72) Inventors: Shuijing Zhu, Changsha (CN); Xiaoxiang Yang, Changsha (CN); Dusheng Feng, Jiujiang (CN)

(73) Assignee: Shenzhen Jiaguo Technology Co., Ltd., Shenzhen (CN)

( * ) Notice: Subject to any disclaimer, the term of this patent is extended or adjusted under 35 U.S.C. 154(b) by 0 days.

(21) Appl. No.: 18/425,388

(22) Filed: Jan. 29, 2024

(65) Prior Publication Data
US 2024/0252956 A1 Aug. 1, 2024

(30) Foreign Application Priority Data

Jan. 31, 2023 (CN) .......................... 202320240330.2

(51) Int. Cl.
*B01D 19/00* (2006.01)
(52) U.S. Cl.
CPC ................. *B01D 19/0036* (2013.01)
(58) Field of Classification Search
CPC ........................................... B01D 19/00–0495
See application file for complete search history.

(56) References Cited

U.S. PATENT DOCUMENTS

| | | | | | |
|---|---|---|---|---|---|
| 4,121,352 | A | * | 10/1978 | Lameris | C10G 31/00 196/128 |
| 4,365,977 | A | * | 12/1982 | Egbert | E21B 21/067 96/196 |
| 5,480,487 | A | * | 1/1996 | Figini | B05C 11/1036 96/194 |
| 7,922,793 | B2 | * | 4/2011 | Tessien | B01J 19/008 95/249 |
| 2001/0052290 | A1 | * | 12/2001 | Nagai | B01D 19/0031 96/6 |
| 2007/0186772 | A1 | * | 8/2007 | Hoffmann | B01D 19/0036 95/266 |
| 2007/0199615 | A1 | * | 8/2007 | Larimer | B65D 81/2038 141/95 |
| 2009/0133579 | A1 | * | 5/2009 | Lahr | C12G 1/00 95/266 |
| 2009/0274793 | A1 | * | 11/2009 | Schroeder | C12H 1/16 426/8 |
| 2021/0022556 | A1 | * | 1/2021 | Chung | A47J 43/0716 |

* cited by examiner

*Primary Examiner* — Christopher P Jones
*Assistant Examiner* — Phillip Y Shao
(74) *Attorney, Agent, or Firm* — ScienBiziP, P.C.

(57) ABSTRACT

The present application provides a device for removing bubbles in a drip adhesive, including a main machine and a container, where the main machine includes a housing provided with a first accommodating cavity located inside the housing and an air vent formed in the housing; a vacuum generator communicating with the air vent and a control module electrically connected to the vacuum generator are accommodated in the first accommodating cavity; and when the container is connected to the main machine, the container and the main machine define a sealed second accommodating cavity which communicates with the vacuum generator through the air vent and is configured to accommodate the drip adhesive to be subjected to bubble removal.

20 Claims, 13 Drawing Sheets

DEVICE FOR REMOVING BUBBLES IN DRIP ADHESIVE

FIELD OF TECHNOLOGY

The present application relates to the technical field of drip adhesive treatment, more specifically to a device for removing bubbles in a drip adhesive.

BACKGROUND

Drip adhesives, also known as epoxy resin, have the characteristics of water resistance, chemical corrosion resistance, and the like, and are widely used in industrial production. With the development of social economy, the crystal clear drip adhesives are used as processing materials for non-industrial crafts by more and more drip adhesive enthusiasts.

A conventional method for using a drip adhesive includes: mixing and stirring a component A and a component B, pouring a mixture into a mold, and waiting for a drip adhesive formed by mixing the two components to be cured and formed. However, the drip adhesive will be in contact with oxygen in air during stirring, and part of the air enters the drip adhesive to cause many bubbles in the drip adhesive. In order to avoid the influence of the bubbles in the drip adhesive on the finished product effect, it is generally necessary to remove the bubbles in the drip adhesive by a device for removing bubbles in a drip adhesive after the drip adhesive is stirred.

However, the device for removing bubbles in a drip adhesive on the market is only suitable for large-scale mechanical industrial production. At present, there is no consumer-grade device for removing bubbles in a drip adhesive, for daily use by drip adhesive enthusiasts.

SUMMARY

The technical problem to be solved by an embodiment of the present application is that an existing device for removing bubbles in a drip adhesive is not suitable for daily use by drip adhesive enthusiasts.

To solve the above technical problem, an embodiment of the present application provides a device for removing bubbles in a drip adhesive, and adopts the following technical solution:

The device for removing bubbles in a drip adhesive includes:

a main machine, where the main machine includes a housing provided with a first accommodating cavity located inside the housing and an air vent formed in the housing, and a vacuum generator communicating with the air vent and a control module electrically connected to the vacuum generator are accommodated in the first accommodating cavity; and a container detachably connected to the main machine, where when the container is connected to the main machine, the container and the main machine define a sealed second accommodating cavity which communicates with the vacuum generator through the air vent and is configured to accommodate the drip adhesive to be subjected to bubble removal.

Further, the main machine further includes an air pressure detection module fixed to the first accommodating cavity and electrically connected to the control module; and when the container is connected to the main machine, at least a part of the air pressure detection module communicates with the second accommodating cavity of the container.

Further, the housing is provided with a connecting table; the connecting table is located in the first accommodating cavity and provided with a first opening, a second opening, and an air guide cavity communicating with the first opening, the second opening, and the air vent; the first opening communicates with the vacuum generator; the air pressure detection module is fixed to the connecting table and covers the second opening; and the second opening exposes a part of the air pressure detection module to the air guide cavity.

Further, a first sealing element is connected to the connecting table and arranged in the second opening, and has a top surface abutting against the air pressure detection module.

Further, the main machine further includes a filtering element located in the air guide cavity between the air vent and the vacuum generator.

Further, the main machine further includes a first shock absorbing element located in the first accommodating cavity and having two opposite side surfaces connected to the vacuum generator and the housing respectively.

Further, the housing includes a surface housing and a bottom housing which are connected to each other and define the first accommodating cavity; the air vent is formed in the bottom housing; when the container is connected to the main machine, the bottom housing and the container define the second accommodating cavity; one surface of the bottom housing that gets close to the first accommodating cavity is provided with a mounting post extending towards the surface housing; the first shock absorbing element is connected to an outer side of the mounting post in a sleeving manner; and a part of the vacuum generator is fixed to an outer side of the first shock absorbing element.

Further, an outer side wall of the first shock absorbing element is provided with a clamping slot recessed in a direction close to an inner side wall of the first shock absorbing element; and the part of the vacuum generator that is connected to the outer side of the first shock absorbing element is clamped with the clamping slot.

Further, the mounting post is a hollow post; the main machine includes a positioning screw; at least a part of a screw rod of the positioning screw is in threaded connection with an inner wall of the mounting post; and a bottom surface of a screw cap of the positioning screw abuts against a top surface of the first shock absorbing element.

Further, the main machine further includes a second shock absorbing element sleeved on a periphery of the mounting post and having two ends connected to the first shock absorbing element and the bottom housing respectively.

Further, the main machine further includes the second shock absorbing element and a third shock absorbing element; the second shock absorbing element is sleeved on the periphery of the mounting post, and has a first end part abutting against the first shock absorbing element and a second end part abutting against a top surface of the third shock absorbing element; and a bottom surface of the third shock absorbing element abuts against the bottom housing.

Further, the vacuum generator includes a vacuum pump and a mounting base; the vacuum pump is fixed to the mounting base; the mounting base includes a mounting base body and at least two mounting rings formed on an outer side of the mounting base body; the vacuum pump is located on the mounting base body; and the mounting rings are clamped on the first shock absorbing element.

Further, the main machine further includes a silencer mounted on the vacuum pump.

Further, the housing is provided with an air relief hole communicating with the outside atmosphere and the second accommodating cavity; the main machine further includes a pressure relief valve separably connected to the housing; and when the air relief hole is in a closed state, the pressure relief valve covers the air relief hole.

Further, a first air guide tube and a second air guide tube are connected to the vacuum pump of the vacuum generator and both located in the first accommodating cavity; two ends of the first air guide tube communicate with the vacuum pump and the air vent; and two ends of the second air guide tube communicate with the air relief hole and the first air guide tube.

Further, the control module includes a button and a control circuit board; the main machine further includes a fourth shock absorbing element; the button is movably connected to a top of the housing; the control circuit board is fixedly connected to the housing by screws and electrically connected to the vacuum generator; when a part of the button is in a pressed state, the pressed part of the button is in contact with the control circuit board; and the fourth shock absorbing element is fixed to the button and located between the button and the housing.

Further, the control module includes a touch display panel and a cover plate; the touch display panel is fixed in the first accommodating cavity; the cover plate is fixed to the top of the housing and located on the touch display panel; and the touch display panel is electrically connected to the vacuum generator and the air pressure detection module.

Further, the main machine further includes a fifth shock absorbing element which is located in an interval space between the vacuum generator and an inner wall of the first accommodating cavity, and has two ends connected to a bottom of the vacuum generator and the housing respectively.

Further, the device for removing bubbles in a drip adhesive further includes a heating module electrically connected to the control module; and when the container is connected to the main machine, the heating module communicates with the second accommodating cavity.

Further, a size of the device for removing bubbles in a drip adhesive is smaller than or equal to 0.02 m$^3$.

Compared with the prior art, the embodiment of the present application has the following beneficial effects:

According to the present application, the vacuum generator and the control module are both mounted in the first accommodating cavity of the housing, such that the vacuum generator and the control module can be integrated in the housing of the main machine, and the main machine is used as a whole to control bubble removal operation on the drip adhesive; and the main machine is detachably connected to the container, such that the container can be used for the drip adhesive to be placed in when separated from the main machine, and a negative pressure state can be formed in the second accommodating cavity under the control of the vacuum generator when the container is connected to the main machine, thereby causing the bubbles inside the uncured drip adhesive in the second accommodating cavity to float up and discharge air to the outside through the air vent, and eventually achieving the effect of removing the bubbles in the drip adhesive. In the device for removing bubbles in a drip adhesive according to the present application, the vacuum generator and the control module are both integrated in the housing, which can reduce the time and energy required for a user to assemble the main machine; and after direct integration, the device for removing bubbles in a drip adhesive is only separated into two structural parts, which are the main machine and the container respectively, at most in a normal standby state, which improves the portability and use convenience of the device for removing bubbles in a drip adhesive, making it meet the daily use requirements of ordinary consumers.

BRIEF DESCRIPTION OF THE DRAWINGS

To more clearly illustrate the solution in the present application, the accompanying drawings that need to be used in the description of the embodiment will be briefly introduced below. Apparently, the accompanying drawings in the description below illustrate some embodiments of the present application. Those of ordinary skill in the art may also derive other accompanying drawings from these accompanying drawings without creative efforts.

Figure 1:
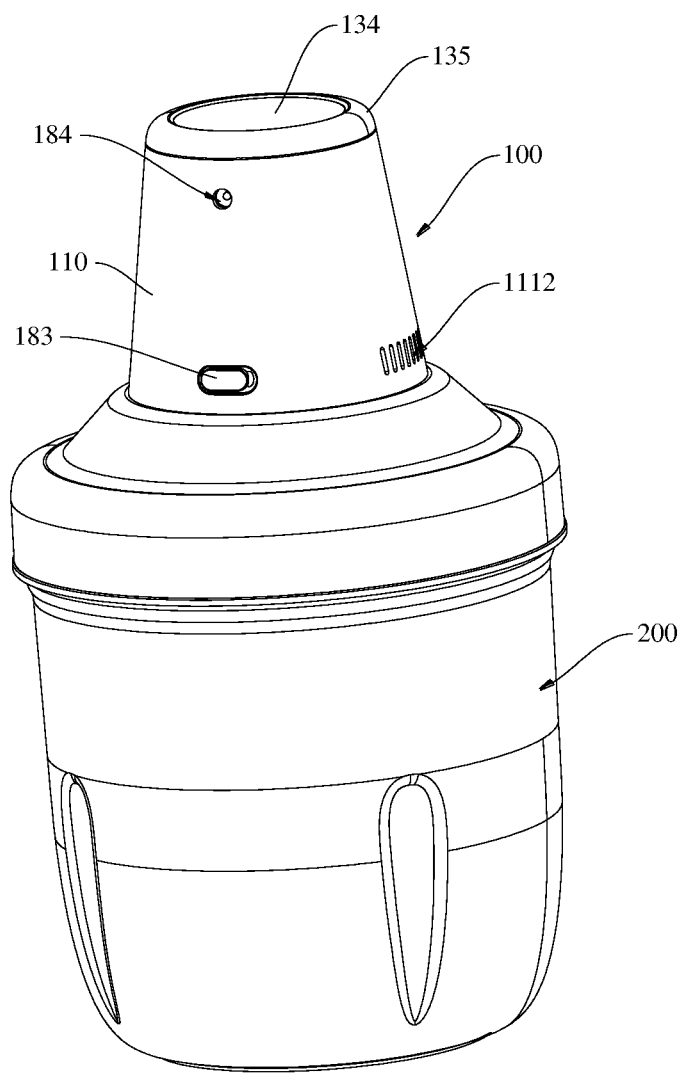
FIG. 1 is a structural diagram of a device for removing bubbles in a drip adhesive in Embodiment 1 of the present application.

In reference signs:
100. main machine; 110. housing; 1101. first accommodating cavity; 1102. air vent; 111. surface housing; 1111. air relief hole; 1112. exhaust hole; 112. bottom housing; 1121. connecting table; 1121a. first opening; 1121b. second opening; 1121c. air guide cavity; 1122. mounting post; 1123. filtering element fixation plate;
120. vacuum generator; 121. vacuum pump; 122. mounting base; 1221. mounting base body; 1222. mounting ring; 123. first air guide tube; 124. second air guide tube; 125. mounting bracket;
130. control module; 131. button; 1311. press part; 1312. elastic connection part; 132. control circuit board; 133. touch display panel; 134. cover plate; 135. guard ring;
140. air pressure detection module; 151. first sealing element; 152. second sealing element; 160. filtering element; 171. first shock absorbing element; 1711. clamping slot; 172. second shock absorbing element; 173. third shock absorbing element; 174. fourth shock absorbing element; 175. fifth shock absorbing element; 181. positioning screw; 182. silencer; 183. pressure relief valve; 184. charging module;
200. container; 201. second accommodating cavity; and 210. non-slip pad.

DESCRIPTION OF THE EMBODIMENTS

Unless otherwise defined, all the technical and scientific terms used herein have the same meanings as those commonly understood by those skilled in the art of the present application. The terms used in the description of the present application are for the purpose of describing specific embodiments only and are not intended to limit the present application. The terms "include/comprise" and "have/has" and any variations thereof in the description and claims as well as the drawings of the present application are intended to cover a non-exclusive inclusion. The terms "first", "second", etc. in the description and claims or the above drawings of the present application are used to distinguish different objects and are not used to describe a particular order.

Reference herein to the "embodiments" means that specific features, structures or characteristics described with reference to the embodiments may be included in at least one embodiment of the present application. The occurrence of "embodiment" in various positions in the specification does not necessarily refer to the same embodiment, nor is it a separate or alternative embodiment that is mutually exclusive to other embodiments. It is explicitly and implicitly understood by those skilled in the art that the embodiments described herein may be combined with other embodiments.

Referring to FIG. 1 to FIG. 17, an embodiment of the present application provides a device for removing bubbles in a drip adhesive, including a main machine 100 and a container 200. The main machine 100 includes a housing 110 provided with a first accommodating cavity 1101 located inside the housing 110 and an air vent 1102 formed in the housing 110, where a vacuum generator 120 communicating with the air vent 1102 and a control module 130 electrically connected to the vacuum generator 120 are accommodated in the first accommodating cavity 1101.

The container 200 is detachably connected to the main machine 100. When the container 200 is connected to the main machine 100, the container 200 and the main machine 100 define a sealed second accommodating cavity 201 which communicates with the vacuum generator 120 through the air vent 1102 and is configured to accommodate the drip adhesive to be subjected to bubble removal. When the container 200 is separated from the main machine 100, an opening of the container 200 is opened for a user to pick and place the drip adhesive.

In the present application, the vacuum generator 120 is configured to extract air in the second accommodating cavity 201 through the air vent 1102, such that a negative pressure state is formed in the second accommodating cavity 201, thereby promoting the bubbles inside the drip adhesive in the second accommodating cavity 201 to float up and be discharged, and thus achieving the effect of removing the bubbles in the drip adhesive.

In the present application, the vacuum generator 120 is a combination of a vacuum pump 121, a first air guide tube 123 communicating with the vacuum pump 121, a second air guide tube 124 communicating with the vacuum pump 121, and a mounting base for connecting the vacuum pump 121 to the housing 110.

According to the present application, the vacuum generator 120 and the control module 130 are both mounted in the first accommodating cavity 1101 of the housing 110, such that the vacuum generator 120 and the control module 130 can be integrated in the housing 110 of the main machine 100, and the main machine 100 is used as a whole to control bubble removal operation on the drip adhesive; and the main machine 100 is detachably connected to the container 200, such that the container 200 can be used for the drip adhesive to be placed in when separated from the main machine 100, and the negative pressure state can be formed in the second accommodating cavity 201 under the control of the vacuum generator 120 when the container 200 is connected to the main machine 100, thereby causing the bubbles inside the uncured drip adhesive in the second accommodating cavity 201 to float up and discharge the air to the outside through the air vent 1102, and eventually achieving the effect of removing the bubbles in the drip adhesive.

In the device for removing bubbles in a drip adhesive according to the present application, the vacuum generator 120 and the control module 130 are both integrated in the housing 110, which can reduce the time and energy required for the user to assemble the main machine 100; and after direct integration, the device for removing bubbles in a drip adhesive is only separated into two structural parts, which are the main machine 100 and the container 200 respectively, at most in a normal standby state, which improves the portability and use convenience of the device for removing bubbles in a drip adhesive, making it meet the daily use requirements of ordinary consumers.

To make those skilled in the art better understand the solutions in the present application, the technical solutions in the embodiments of the present application are clearly and completely described below with reference to the accompanying drawings.

Embodiment 1 of a device for removing bubbles in a drip adhesive according to the present application As shown in FIG. 1 to FIG. 6, a device for removing bubbles in a drip adhesive provided in Embodiment 1 of the present application includes a main machine 100 and a container 200. The main machine 100 includes a housing 110 provided with a first accommodating cavity 1101 located inside the housing 110 and an air vent 1102 formed in the housing 110, where a vacuum generator 120 communicating with the air vent 1102 and a control module 130 electrically connected to the vacuum generator 120 are accommodated in the first accommodating cavity 1101.

The container 200 is detachably connected to the main machine 100. When the container 200 is connected to the main machine 100, the container 200 and the main machine 100 define a sealed second accommodating cavity 201 which communicates with the vacuum generator 120 through the air vent 1102 and is configured to accommodate the drip adhesive to be subjected to bubble removal. When the container 200 is separated from the main machine 100, an opening of the container 200 is opened for a user to pick and place the drip adhesive.

According to the device for removing bubbles in a drip adhesive in this embodiment, the vacuum generator 120 and the control module 130 are both integrated in the housing 110. A machine for removing bubbles in a drip adhesive is provided and suitable for household use. During use of the device for removing bubbles in a drip adhesive according to the present application, the user does not need to assemble pipelines in the vacuum generator 120, which reduces the time and energy required for the user to treat the drip adhesive. In addition, due to the integrity of the main machine 100, the device for removing bubbles in a drip adhesive provided by the present application is only separated into two structural parts, namely the main machine 100 and the container 200, in a normal standby state, which effectively improves the portability; and the main machine 100 and the container 200 only need to be assembled and fixed during use, such that the use convenience of the user is also improved.

In summary, the device for removing bubbles in a drip adhesive according to the present application further has the advantages of being convenient to carry and efficient in bubble removal, and can meet the daily use requirements of the user.

Figure 3:
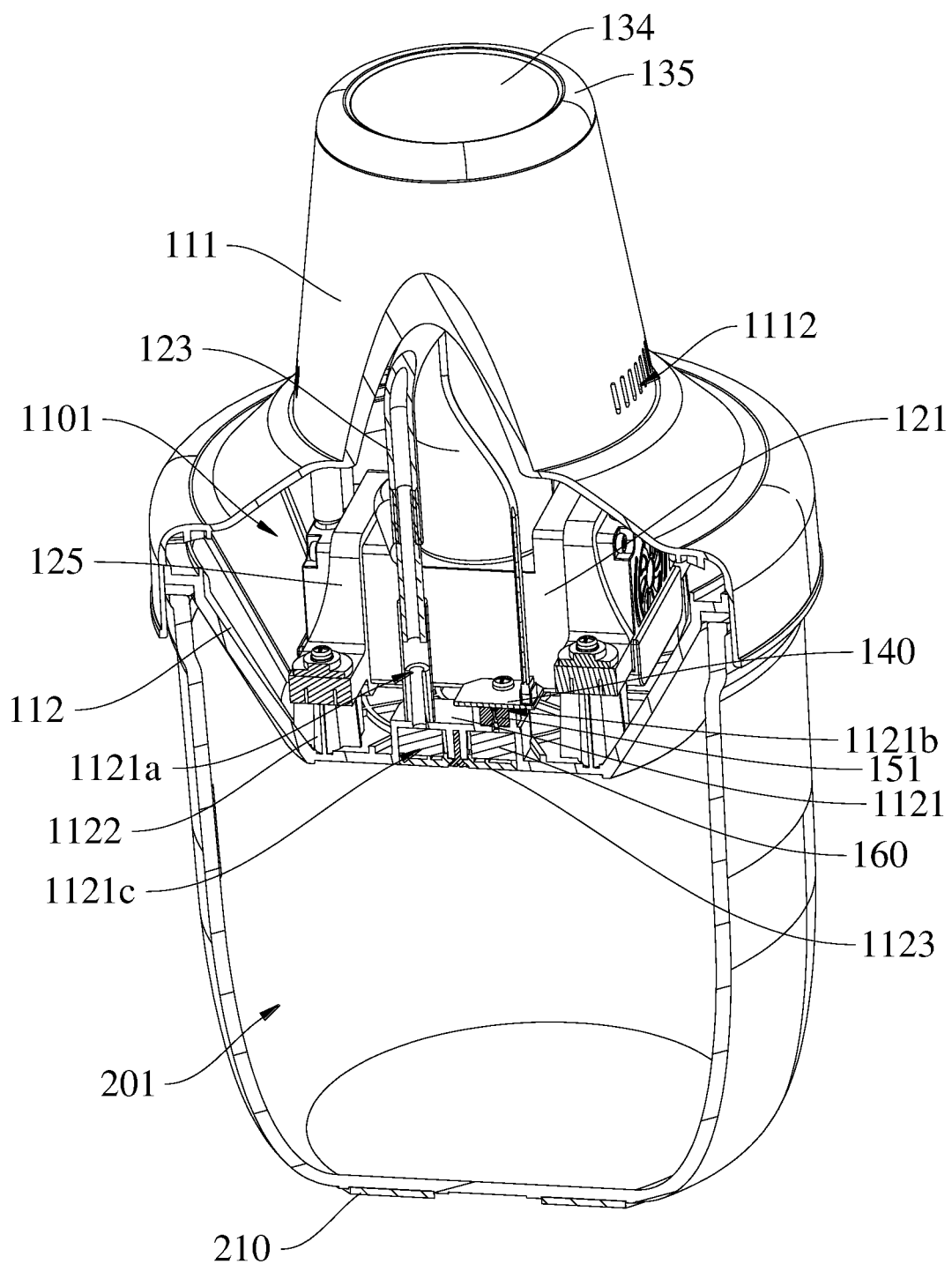
FIG. 3 is a sectional view of A-A' in the device for removing bubbles in a drip adhesive shown in FIG. 2.
Figure 4:
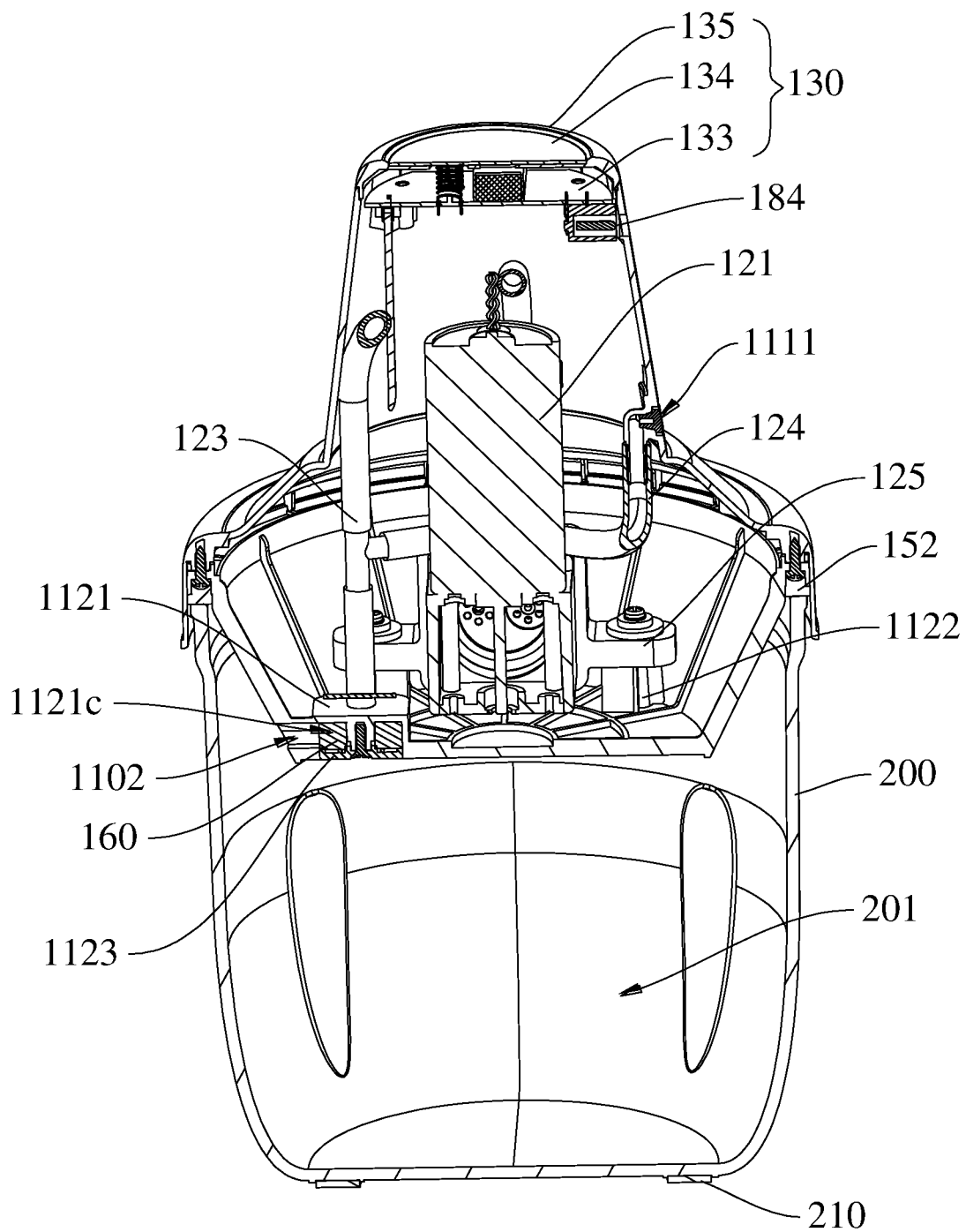
FIG. 4 is a sectional view of B-B' in the device for removing bubbles in a drip adhesive shown in FIG. 2.
Figure 5:
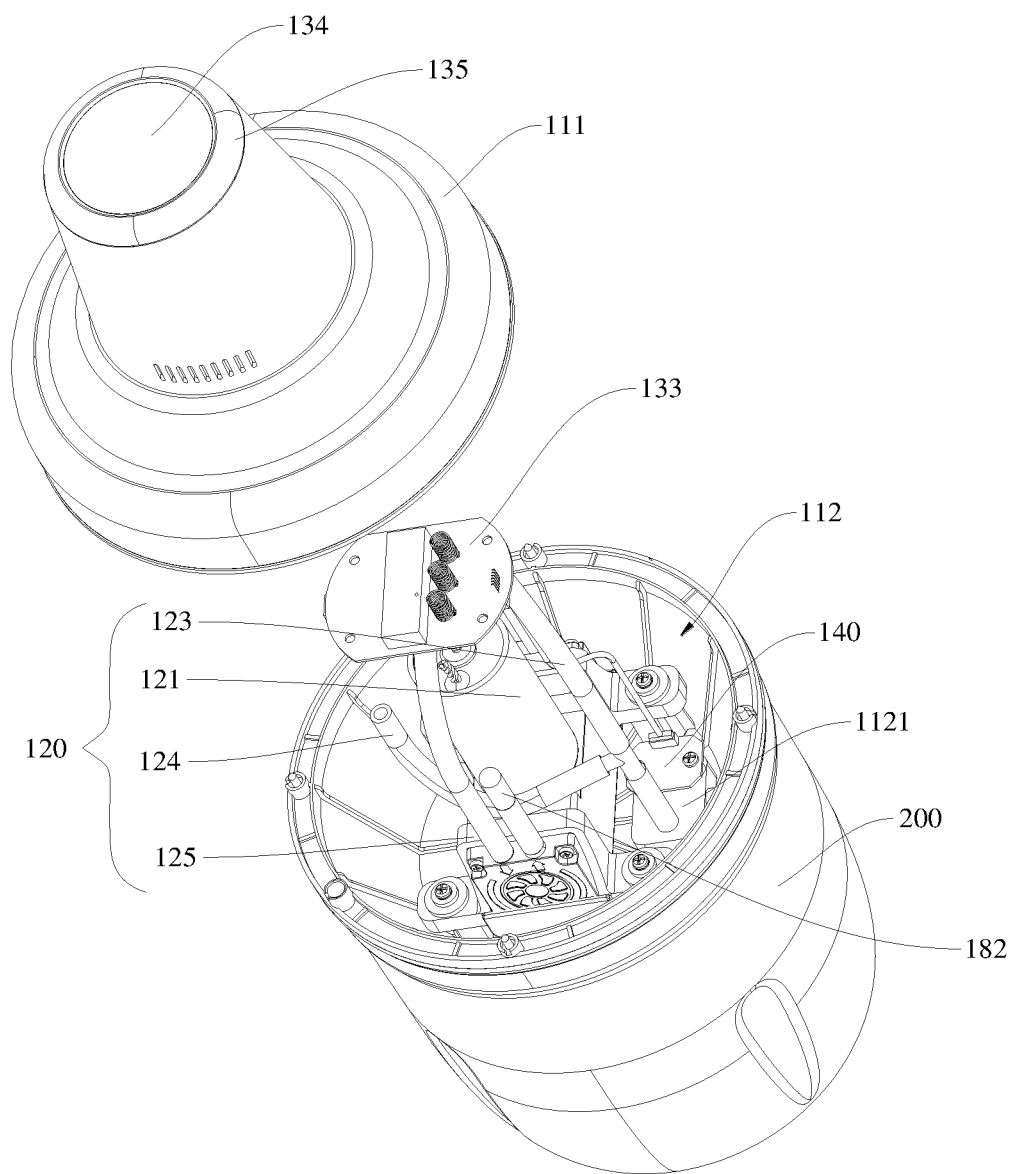
FIG. 5 is a structural diagram of an interior of a main machine in the device for removing bubbles in a drip adhesive shown in FIG. 1.

As shown in FIG. 3 to FIG. 5, in this embodiment, the main machine 100 further includes an air pressure detection module 140 fixed to the first accommodating cavity 1101 and electrically connected to the control module 130; and when the container 200 is connected to the main machine 100, at least a part of the air pressure detection module 140 communicates with the second accommodating cavity 201 of the container 200.

The air pressure detection module 140 is configured to detect an air pressure in the second accommodating cavity 201. In this embodiment, when the air pressure detection module 140 detects that the air pressure in the second accommodating cavity 201 exceeds a preset safety threshold, an air pressure signal is fed back to the control module 130, and the control module 130 stops operation of the vacuum generator 120 based on a preset control mode to prevent the device for removing bubbles in a drip adhesive from being damaged, so as to implement an automatic protection function of the device.

Alternatively, in some other embodiments, the main machine 100 further includes an alarm module fixed to the housing 110 and electrically connected to the air pressure detection module 140; and when the air pressure detection module 140 detects that the air pressure in the second accommodating cavity 201 exceeds the preset safety threshold, an alarm signal is sent to the alarm module to make the alarm module give an alarm, to prompt the user to turn off the vacuum generator 120 in time. The alarm of the alarm module is a voice alarm and/or a cue light alarm.

As shown in FIG. 3 to FIG. 5, in this embodiment, the housing 110 is provided with a connecting table 1121; the connecting table 1121 is located in the first accommodating cavity 1101 and provided with a first opening 1121a, a second opening 1121b, and an air guide cavity 1121c communicating with the first opening 1121a, the second opening 1121b, and the air vent 1102; the first opening 1121a communicates with the vacuum generator 120; the air pressure detection module 140 is fixed to the connecting table 1121 and covers the second opening 1121b; and the second opening 1121b exposes a part of the air pressure detection module 140 to the air guide cavity 1121c.

In this embodiment, the connecting table 1121 is arranged, such that the air guide cavity 1121c in the connecting table 1121 can simultaneously communicate with the air vent 1102, the first opening 1121a, and the second opening 1121b, the vacuum generator 120 and the air pressure detection module 140 can communicate with the second accommodating cavity 201, and one air vent 1102 only needs to be provided in the housing 110 to ensure that the main machine 100 monitors the air pressure in the second accommodating cavity 201 in real time while extracting the air in the second accommodating cavity 201. The main machine 100 in this embodiment has the better structural integrity and a simpler structure, and it can be ensured that the air pressure detection module 140 can detect the air pressure in the second accommodating cavity 201 more accurately.

As shown in FIG. 3, in this embodiment, a first sealing element 151 is connected to the connecting table 1121 and arranged in the second opening 1121b, and has a top surface abutting against the air pressure detection module 140, to reduce the problem of air leakage of a connecting gap between the air pressure detection module 140 and the connecting table 1121.

The air pressure detection module 140 includes an air pressure detection circuit board and an air pressure sensor, where the air pressure detection circuit board is fixed to the connecting table 1121 by screws, covers the second opening 1121b, and abuts against the first sealing element 151; and the air pressure sensor is fixed to the air pressure detection circuit board, electrically connected to the air pressure detection circuit board, located in the second opening 1121b, and exposed to the air guide cavity 1121c.

As shown in FIG. 4, in this embodiment, the main machine 100 further includes a second sealing element 152; the housing 110 is provided with an insertion slot; the second sealing element 152 is fixed in the insertion slot; and when the container 200 is connected to the main machine 100, a peripheral edge of the opening of the container 200 is inserted into the insertion slot and abuts against the second sealing element 152.

The first sealing element 151 and the second sealing element 152 are configured to ensure the sealing performance of the second accommodating cavity 201 and improve the negative pressure effect of the second accommodating cavity 201 when the vacuum generator 120 operates, thereby improving the bubble removal efficiency of the device.

In this embodiment, both the first sealing element 151 and the second sealing element 152 are made of silica gel.

As shown in FIG. 3 and FIG. 4, in this embodiment, the main machine 100 further includes a filtering element 160 located in the air guide cavity 1121c between the air vent 1102 and the vacuum generator 120. The filtering element 160 can filter air entering the vacuum generator 120 from the second accommodating cavity 201 and air entering the second accommodating cavity 201 from the vacuum generator 120. On one hand, impurities in the air in the second accommodating cavity 201 can be prevented from entering the vacuum generator 120, to ensure the use safety of the vacuum generator 120 and prolong the service life of the vacuum generator 120; and on the other hand, during pressure relief, air impurities in the vacuum generator 120 can be prevented from entering the drip adhesive in the second accommodating cavity 201, to ensure that the drip adhesive is prevented from being polluted by the outside.

Figure 6:
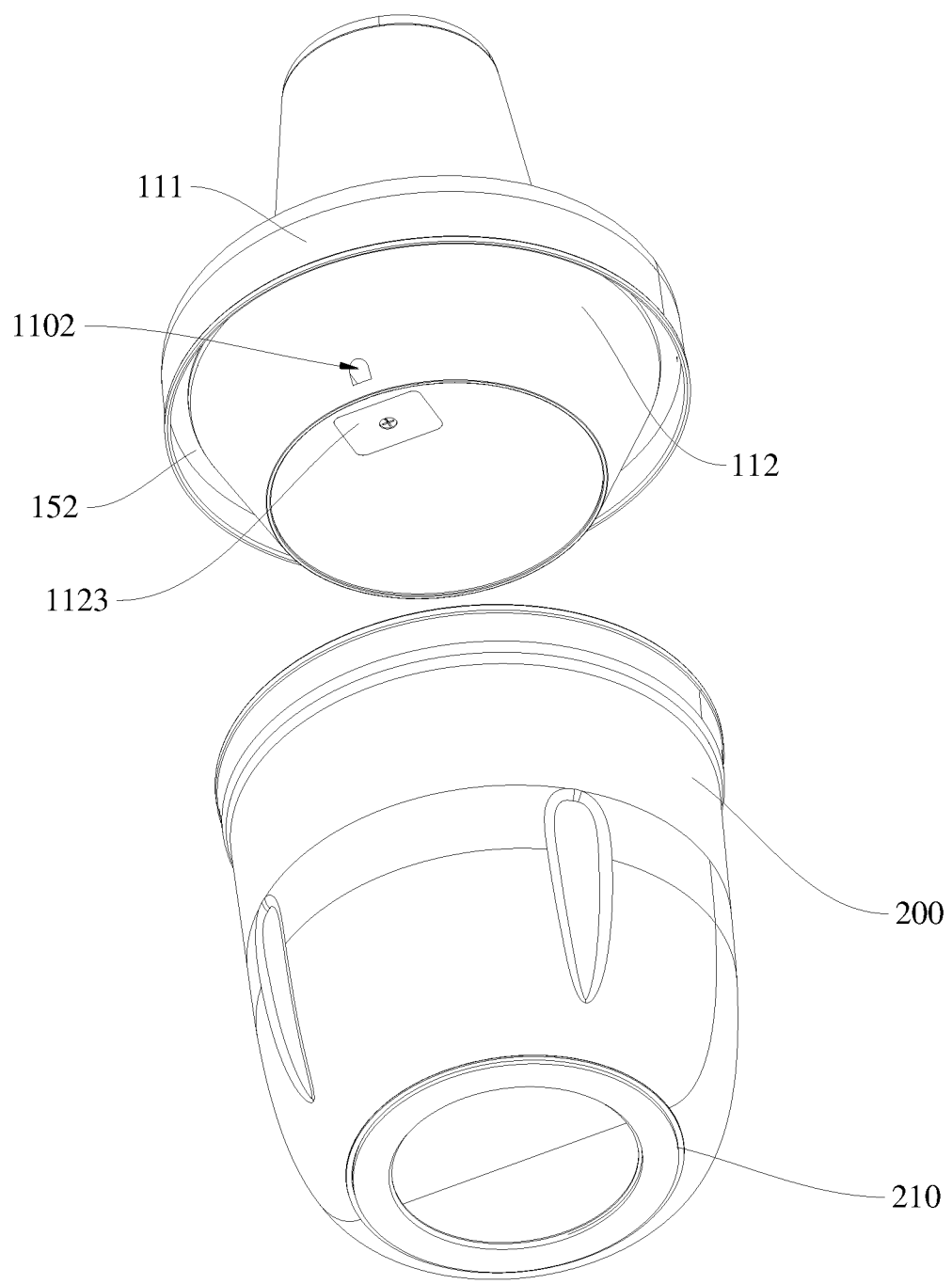
FIG. 6 is a structural diagram of separation of a main machine and a container in the device for removing bubbles in a drip adhesive shown in FIG. 1.
Figure 7:
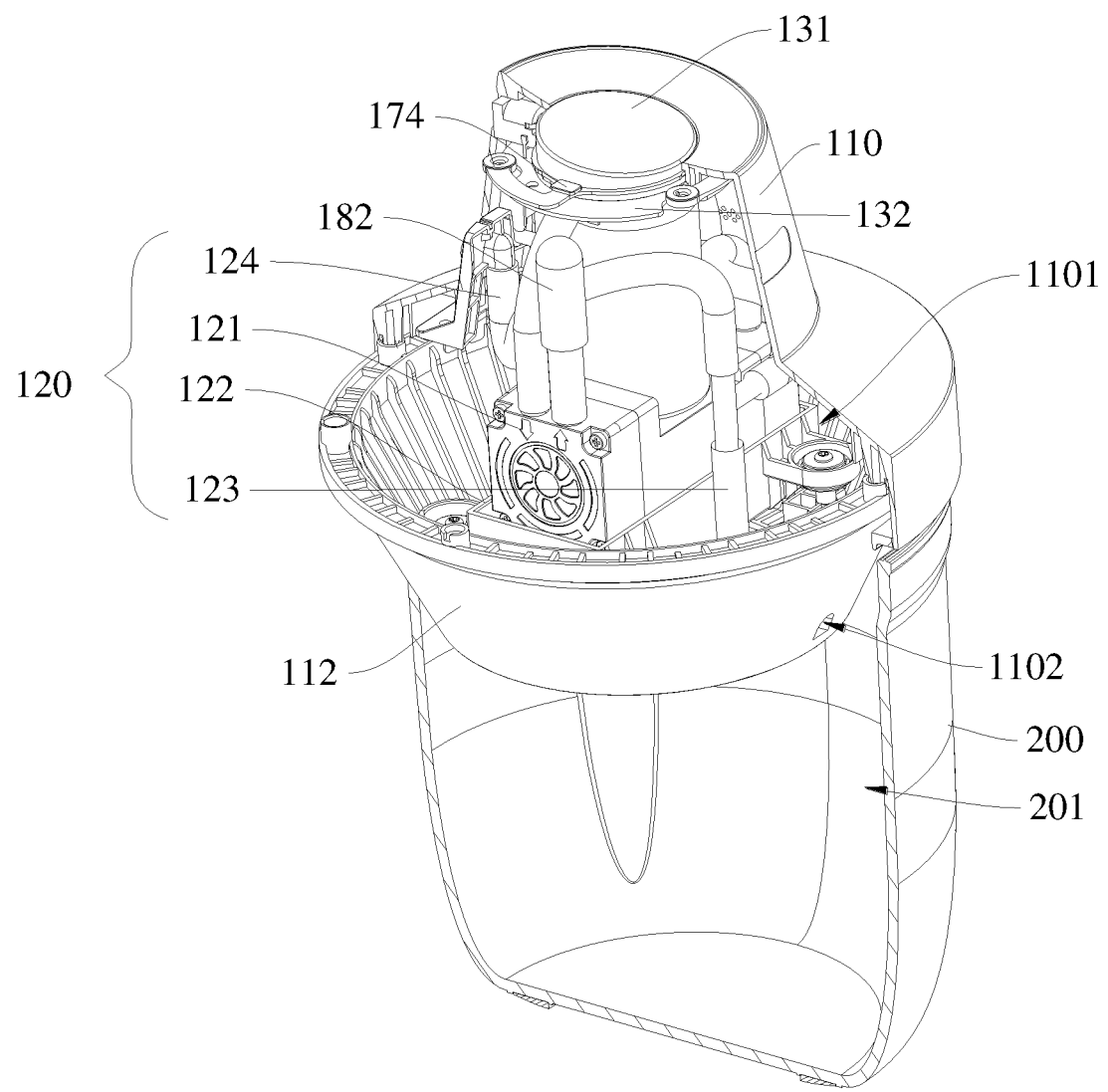
FIG. 7 is a schematic diagram of an internal structure of a device for removing bubbles in a drip adhesive in Embodiment 2 of the present application.

As shown in FIG. 3, FIG. 4, and FIG. 6, in this embodiment, the main machine 100 further includes a filtering element fixation plate 1123 detachably fixed to a bottom of the housing 110, where the filtering element fixation plate 1123 covers a bottom surface of the air guide cavity 1121c and is configured to fix the filtering element 160 in the air guide cavity 1121c. In this embodiment, the filtering element fixation plate 1123 is arranged, which facilitates the replacement, cleaning, or repair of the filtering element 160, and helps to the later use and maintenance of the device, thereby ensuring smooth flow of air between the second accommodating cavity 201 and the vacuum generator 120.

In this embodiment, the filtering element 160 is made of sponge or foam.

As shown in FIG. 5, in this embodiment, the main machine 100 further includes a silencer 182. The silencer 182 is mounted on a vacuum pump 121 to reduce noise generated by the vacuum pump 121, such that the device can be used more silently and is suitable for household use by drip adhesive enthusiasts.

Figure 2:
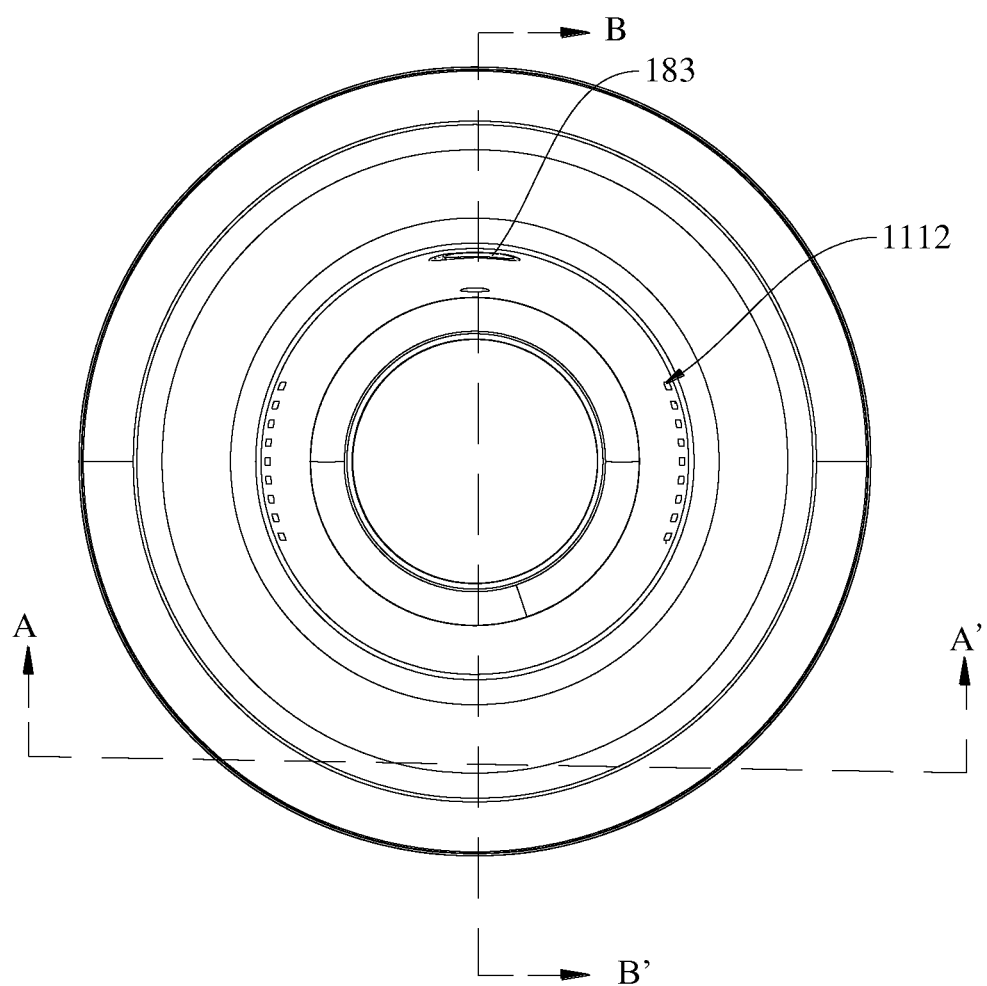
FIG. 2 is a top view of the device for removing bubbles in a drip adhesive shown in FIG. 1.

As shown in FIG. 1, FIG. 2, and FIG. 4, in this embodiment, the housing 110 is provided with an air relief hole 1111 communicating with the outside atmosphere and the second accommodating cavity 201; the main machine 100 further includes a pressure relief valve 183 hermetically arranged at the air relief hole 1111; when air relief is required, the pressure relief valve 183 is opened to make the air relief hole 1111 communicate with the outside; and when air relief is not required, the pressure relief valve 183 covers the air relief hole 1111.

Specifically, when the pressure relief valve 183 covers the air relief hole 1111, the air relief hole 1111 is closed; when the vacuum generator 120 starts to operate, the air in the second accommodating cavity 201 is driven by the vacuum generator 120 to be discharged into the vacuum generator 120 through the air vent 1102, then is discharged into the first accommodating cavity 1101, and finally is discharged to the outside atmosphere, such that the air pressure in the second accommodating cavity 201 forms a negative pressure; and when the pressure relief valve 183 is separated from the housing 110, the air relief hole 1111 is opened, and the air in the outside atmosphere enters the second accommodating cavity 201 through a pressure relief hole, such that the air pressure in the second accommodating cavity 201 is restored to the atmospheric pressure, and the container 200 can be disassembled from the main machine 100.

In this embodiment, the pressure relief valve 183 is made of silica gel or rubber. The pressure relief valve 183 is detachably connected to the housing 110 for the user to manually open or cover the air relief hole 1111.

Alternatively, the pressure relief valve 183 is set as an electromagnetic valve electrically connected to the control module 130, such that the automatic pressure relief of the device for removing bubbles in a drip adhesive is implemented, the use convenience of the device is improved, the difficulty and complexity of the bubble removal operation on the drip adhesive are further reduced, and the user operation is easier.

As shown in FIG. 3, in this embodiment, the vacuum generator 120 includes the vacuum pump 121 and a mounting bracket 125 connected to an outer side of the vacuum pump 121 in a sleeving manner, where the mounting bracket 125 is fixedly connected to the housing 110 by screws to fix the vacuum pump 121 in the first accommodating cavity 1101 of the housing 110; and the outer side of the vacuum pump 121 is attached to the mounting bracket 125 to ensure the stability of an interior of the main machine 100.

As shown in FIG. 3 and FIG. 4, in this embodiment, the housing 110 includes a surface housing 111 and a bottom housing 112 which are connected to each other and define the first accommodating cavity 1101; the air vent 1102 is formed in the bottom housing 112; when the container 200 is connected to the main machine 100, the bottom housing 112 and the container 200 define the second accommodating cavity 201; one surface of the bottom housing 112 that gets close to the first accommodating cavity 1101 is provided with a mounting post 1122 extending towards the surface housing 111; and the mounting bracket 125 is fixed to the mounting post 1122 by screws. The mounting post 1122 supports the vacuum pump 121, such that there is a certain interval space between the vacuum pump 121 and an inner wall of the housing 110, thereby preventing the vacuum pump 121 from colliding with the housing 110 due to vibration during operation.

As shown in FIG. 3 to FIG. 5, in this embodiment, a first air guide tube 123 and a second air guide tube 124 are connected to the vacuum pump 121 of the vacuum generator 120 and both located in the first accommodating cavity 1101; two ends of the first air guide tube 123 communicate with the vacuum pump 121 and the air vent 1102; and two ends of the second air guide tube 124 communicate with the air relief hole 1111 and the first air guide tube.

When the pressure relief valve 183 closes the air relief hole 1111, the second air guide tube 124 is not connected, and the air in the second accommodating cavity 201 enters the first air guide tube 123 through the air vent 1102 under the pumping effect of the vacuum pump 121, then is discharged to the first accommodating cavity 1101 through the vacuum pump 121, and finally is discharged to the outside atmosphere. When the pressure relief valve 183 opens the air relief hole 1111, the second air guide tube 124 is connected, and the outside air enters from the pressure relief hole, passes through the second air guide tube 124 and the first air guide tube 123 in sequence, and then enters the second accommodating cavity 201 from the air vent 1102, such that the air pressure in the second accommodating cavity 201 is restored to the atmospheric pressure.

In this embodiment, the first air guide tube 123 and the second air guide tube 124 are assembled with the vacuum pump 121 in the first accommodating cavity 1101 of the housing 110 in advance, such that the pipelines in the vacuum generator 120 do not need to be assembled before the main machine 100 operates, thereby providing the convenience for the user to use the device for removing bubbles in a drip adhesive according to the present application, and improving the efficiency of removing the bubbles in the drip adhesive.

As shown in FIG. 1 to FIG. 3, in this embodiment, the surface housing 111 is provided with an exhaust hole 1112, and the exhaust hole 1112 penetrates through the surface housing 111 to implement communication between the first accommodating cavity 1101 and the outside atmosphere. When the vacuum pump 121 vacuumizes the second accommodating cavity 201, the vacuum pump 121 discharges the air pumped from the second accommodating cavity 201 to the first accommodating cavity 1101, and the air is finally discharged to the outside atmosphere through the exhaust hole 1112, so as to ensure that the air can be discharged to the atmosphere in time, and keep smooth airflow in the main machine 100. The accelerated discharge of the air in the first accommodating cavity 1101 may play a role in timely heat dissipation of the vacuum pump 121, thereby prolonging the service life of the vacuum pump 121.

As shown in FIG. 3 to FIG. 5, in this embodiment, the control module 130 includes a touch display panel 133 and a cover plate 134; the touch display panel 133 is fixed in the first accommodating cavity 1101; the cover plate 134 is fixed to a top of the housing 110 and located on the touch display panel 133; and the touch display panel 133 is electrically connected to the vacuum generator 120 and the air pressure detection module 140. The touch display panel 133 receives an operation instruction from the user and controls the vacuum generator 120 and the air pressure detection module 140 to start or stop operating based on the operation instruction. The cover plate 134 is configured to protect the touch display panel 133 and prevent a touch electrode layer, a pixel electrode layer, and other film structures of the touch display panel 133 from being scratched or crushed, thereby ensuring the stability and reliability of the control module 130.

In this embodiment, a guard ring 135 is further arranged around the cover plate 134 and mounted at the top of the housing 110, and a top surface of the guard ring 135 is higher than a top surface of the cover plate 134, which can effectively prevent the cover plate 134 from being scratched.

In this embodiment, at least a part of the container 200 is made of a transparent material, such that the user can intuitively see a bubble removal progress and a bubble removal condition of the drip adhesive and then adjust related bubble removal operation of the main machine 100 based on the bubble removal progress at any time, thereby implementing more personalized control on the effect of removing the bubbles in the drip adhesive.

Specifically, all or a part of the container 200 is made of the transparent material, and another part of the container is made of an opaque material.

In this embodiment, a material of the container 200 is selected from transparent polycarbonate (PC) plastics, transparent acrylonitrile-butadiene-styrene (ABS) block copolymer plastics, or transparent glass.

As shown in FIG. 1 and FIG. 4, in this embodiment, the main machine 100 further includes a charging module 184 fixed to the housing 110 and electrically connected to the control module 130, where the charging module 184 is electrically connected to an external power supply device, to supply power to the control module 130. Optionally, a power supply module capable of storing energy may be arranged in the main machine 100 and is charged by a charging device, such that the device for removing bubbles in a drip adhesive can be used movably.

In this embodiment, a size of the device for removing bubbles in a drip adhesive is smaller than or equal to 0.02 $m^3$. The device for removing bubbles in a drip adhesive according to the present application is small in overall size and convenient to carry, thereby being suitable for use in different occasions, and meeting the daily use requirements of the drip adhesive enthusiasts. The device for removing bubbles in a drip adhesive is simple and convenient to operate and suitable for household use.

In this embodiment, the size of the device for removing bubbles in a drip adhesive is smaller than or equal to 0.014 $m^3$.

In this embodiment, the container 200 of the device for removing bubbles in a drip adhesive can accommodate 500 ml of the drip adhesive.

In this embodiment, the device for removing bubbles in a drip adhesive has a length of 150-250 mm, a width of 150-250 mm, and a height of 250-320 mm.

In this embodiment, the container 200 has a diameter of 150-200 mm and a height of 110-200 mm.

The device for removing bubbles in a drip adhesive in this embodiment has a much smaller size than an existing device for removing bubbles in a drip adhesive, is convenient to carry, and can be used in various daily scenes.

As shown in FIG. 3 to FIG. 6, in this embodiment, a non-slip pad 210 is further arranged at a bottom of the container 200 and is made of silica gel. In this embodiment, the non-slip pad 210 is arranged at the bottom of the container 200. On one hand, the device has a non-slip function and is prevented from moving due to vibration during operation of the vacuum generator 120; and on the other hand, the shock absorbing effect may be achieved. The non-slip pad 210 can further absorb vibration energy of the container 200 to improve the stability of the device, such that the device can meet the household use requirements of the device for removing bubbles in a drip adhesive.

Embodiment 2 of a device for removing bubbles in a drip adhesive according to the present application As shown in FIG. 7 to FIG. 14, Embodiment 2 of the present application is similar to Embodiment 1. Embodiment 2 may be combined with Embodiment 1. There are the differences between Embodiment 2 and Embodiment 1 below.

Figure 8:
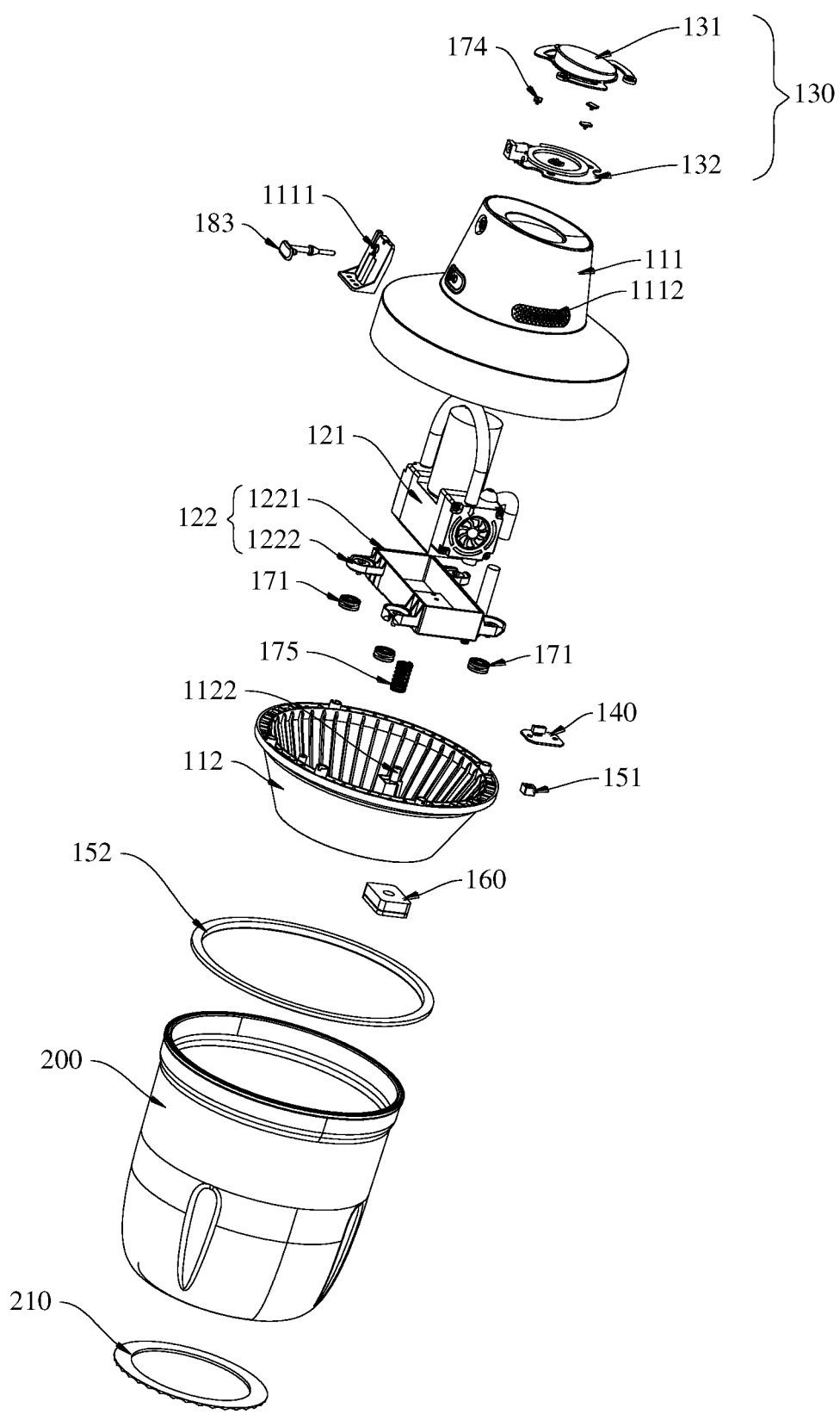
FIG. 8 is an exploded view of the device for removing bubbles in a drip adhesive shown in FIG. 7.
Figure 13:
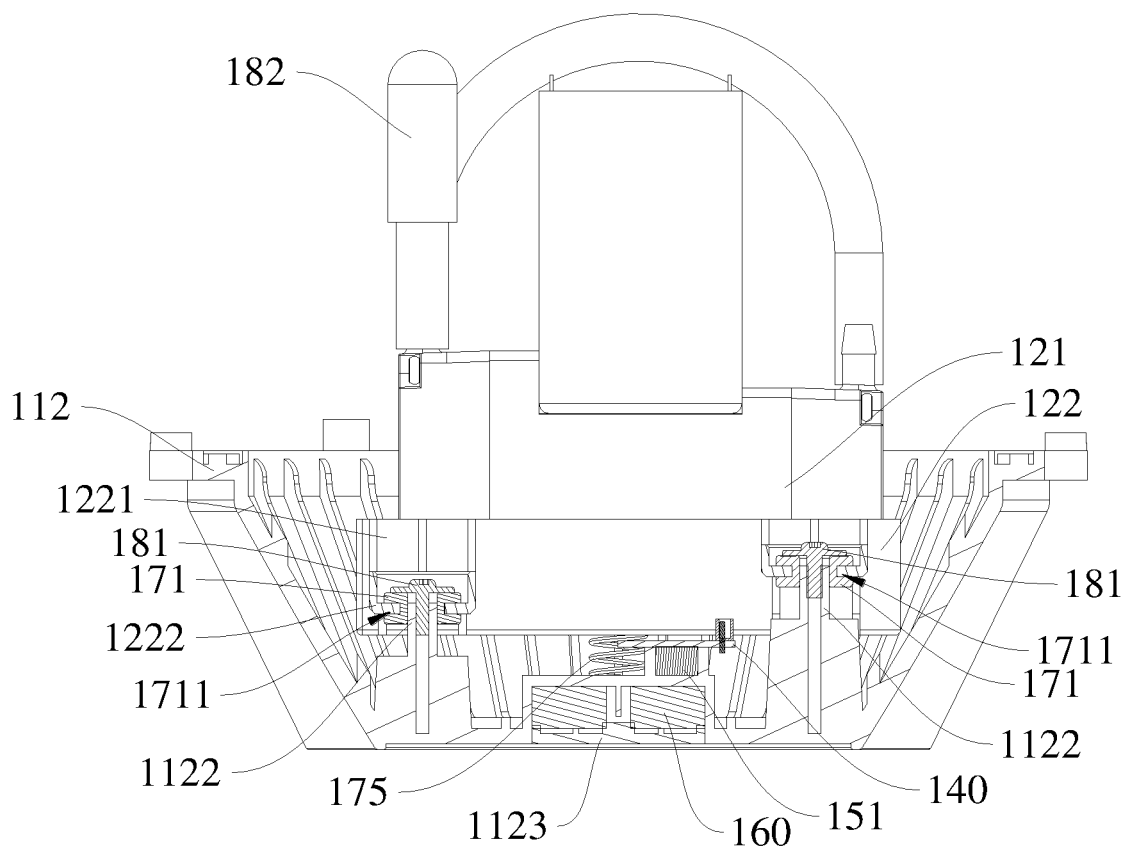
FIG. 13 is a sectional view of a connection relationship among a bottom housing, a vacuum generator, and a first shock absorbing element in the device for removing bubbles in a drip adhesive shown in FIG. 7.

As shown in FIG. 8 and FIG. 13, in this embodiment, the main machine 100 further includes a first shock absorbing element 171 located in the first accommodating cavity 1101 and having two opposite side surfaces connected to the vacuum generator 120 and the housing 110 respectively.

In this embodiment, the two opposite side surfaces of the first shock absorbing element 171 are connected to the vacuum generator 120 and the housing 110 respectively, such that the first shock absorbing element 171 is clamped between the vacuum generator 120 and the housing 110. On one hand, kinetic energy transmitted from the vacuum generator 120 to the housing 110 can be reduced to ensure the stability of the device during use, and noise generated by vibration of the device can be reduced to improve the usage experience of the user; and on the other hand, the problem that the connection between the vacuum generator 120 and the housing 110 becomes loose with collision between the vacuum generator 120 and the housing 110 due to vibration can be improved.

As shown in FIG. 8 and FIG. 13, in this embodiment, the housing 110 includes a surface housing 111 and a bottom housing 112 which are connected to each other and define the first accommodating cavity 1101; the air vent 1102 is formed in the bottom housing 112; when the container 200 is connected to the main machine 100, the bottom housing 112 and the container 200 define the second accommodating cavity 201; one surface of the bottom housing 112 that gets close to the first accommodating cavity 1101 is provided with a mounting post 1122 extending towards the surface housing 111; the first shock absorbing element 171 is connected to an outer side of the mounting post 1122 in a sleeving manner; and a part of the vacuum generator 120 is fixed to an outer side of the first shock absorbing element 171.

In this embodiment, the first shock absorbing element 171 is clamped between the mounting post 1122 and the vacuum generator 120, to reduce the influence of the vibration on the mounting post 1122 when the vacuum generator 120 operates, achieve the shock absorbing effect on the housing 110, reduce the vibration generated by the housing 110 when the device operates, and improve the stability and reliability of the device.

As shown in FIG. 13, in this embodiment, an outer side wall of the first shock absorbing element 171 is provided with a clamping slot 1711 recessed in a direction close to an inner side wall of the first shock absorbing element 171; and the part of the vacuum generator 120 that is connected to the outer side of the first shock absorbing element 171 is clamped with the clamping slot 1711.

In this embodiment, the inner side wall of the first shock absorbing element 171 is attached to an outer side wall of the mounting post 1122, and the outer side of the first shock absorbing element 171 is in clamped connection with the vacuum generator 120, such that the vacuum generator 120 can be more firmly fixed to the first shock absorbing element 171; and the first shock absorbing element 171 is closely attached to the vacuum generator 120, which ensures the shock absorbing effect of the device.

Figure 14:
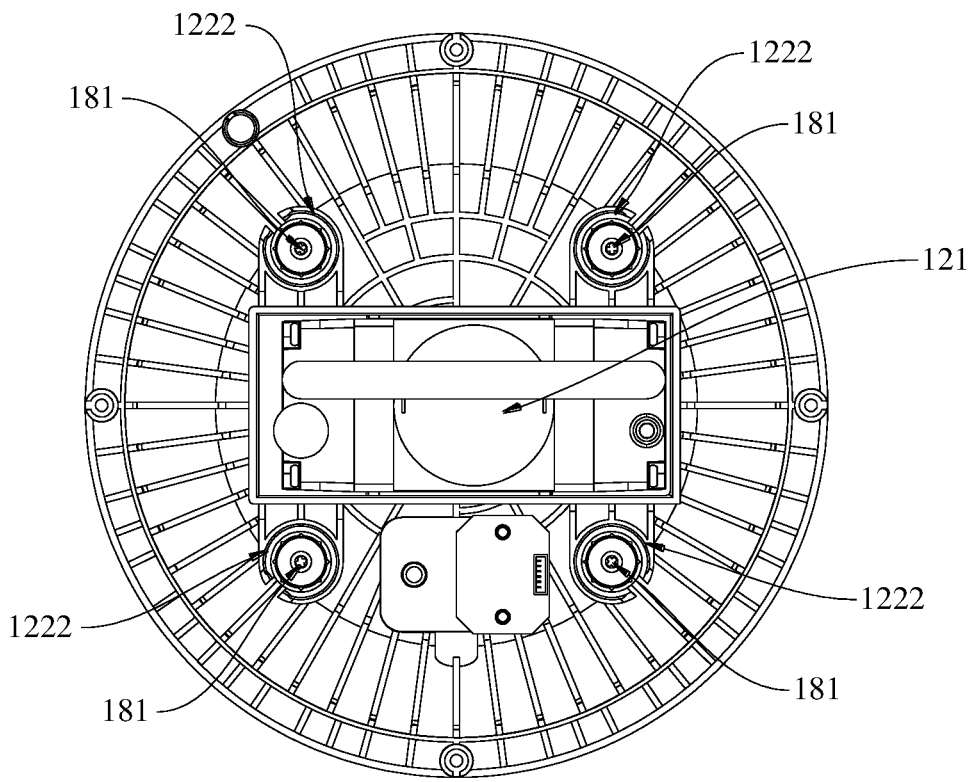
FIG. 14 is a top view of a bottom housing and a vacuum generator in the device for removing bubbles in a drip adhesive shown in FIG. 7.

As shown in FIG. 8, FIG. 13, and FIG. 14, specifically, the vacuum generator 120 includes a vacuum pump 121 and a mounting base 122; the vacuum pump 121 is fixed to the mounting base 122; the mounting base 122 includes a mounting base body 1221 and at least two mounting rings 1222 formed on an outer side of the mounting base body 1221; the vacuum pump 121 is located on the mounting base body 1221; and the mounting rings 1222 are clamped on the first shock absorbing element 171. In this embodiment, the mounting base 122 is arranged, such that vacuum pumps 121 of different models and shapes can be fixed in the first accommodating cavity 1101 of the housing 110; and the mounting base 122 can adapt to more types of vacuum pumps 121, so as to facilitate the subsequent component replacement and repair of the device. The body of the mounting base 122 further plays a role in support and shock absorption of the vacuum pump 121, which further optimizes the shock absorbing performance of the device. Four mounting rings 1222 are formed on the outer side of the body of the mounting base 122. The mounting rings 1222 are clamped and matched with the clamping slot 1711 of the first shock absorbing element, which improves the tightness of connection between the mounting base 122 and the first shock absorbing element 171.

As shown in FIG. 13, in this embodiment, the mounting post 1122 is a hollow post; the main machine 100 includes a positioning screw 181; at least a part of a screw rod of the positioning screw 181 is in threaded connection with an inner wall of the mounting post 1122; the positioning screw 181 is configured to fix the first shock absorbing element 171 to the mounting base; and a bottom surface of a screw cap of the positioning screw 181 abuts against a top surface of the first shock absorbing element 171, to prevent the first shock absorbing element 171 from separating from the mounting post 1122 when the vacuum pump 121 vibrates for multiple times, thereby ensuring the reliability of an internal structure of the main machine 100.

Figure 9:
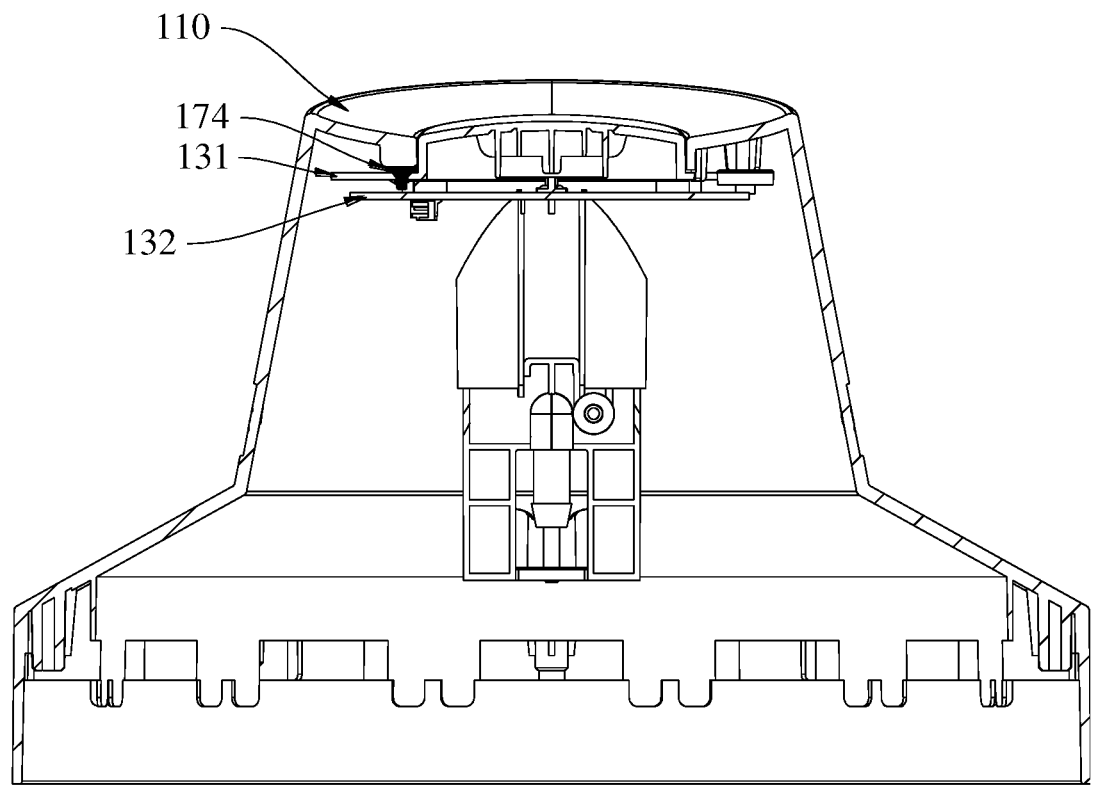
FIG. 9 is a schematic diagram of a connection relationship among a housing, a fourth shock absorbing element, and a control module in the device for removing bubbles in a drip adhesive shown in FIG. 7.
Figure 10:
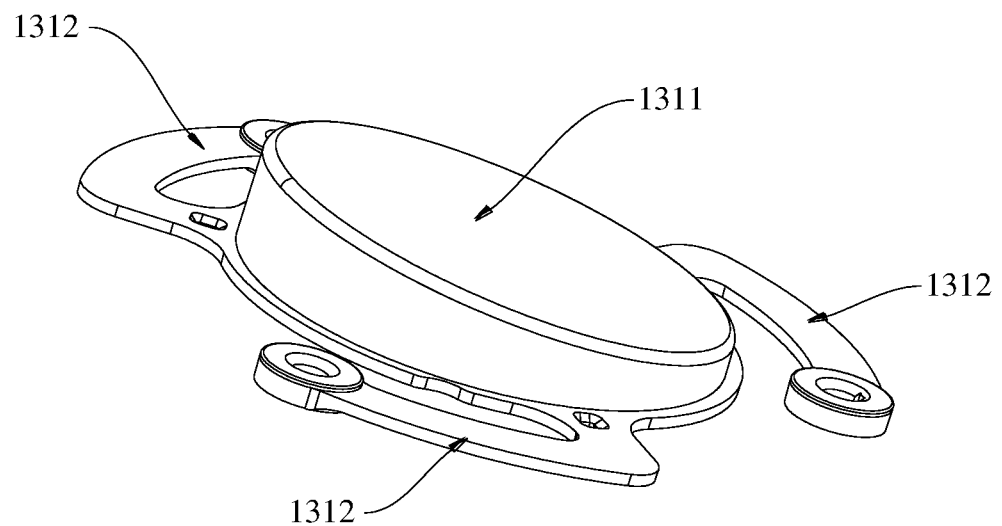
FIG. 10 is a schematic diagram of a button in the device for removing bubbles in a drip adhesive shown in FIG. 7.
Figure 11:
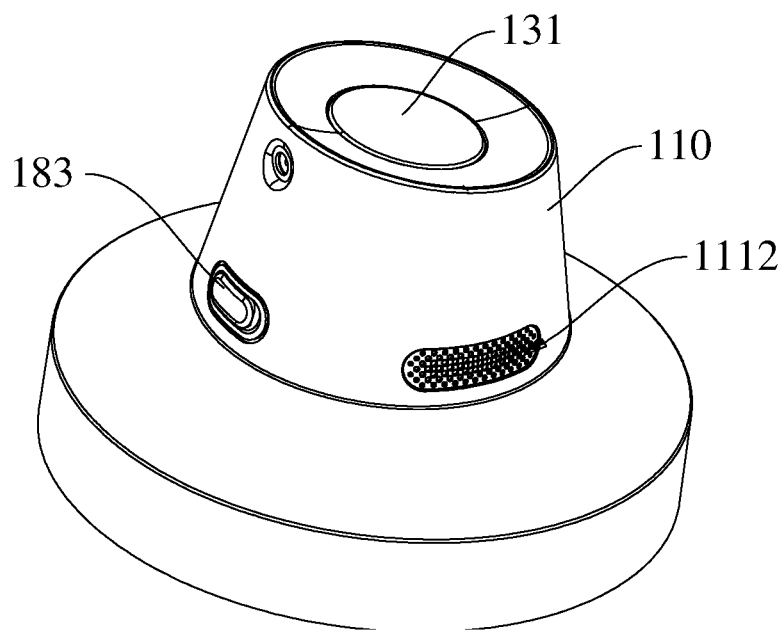
FIG. 11 is a schematic diagram of covering an air relief hole by a pressure relief valve in the device for removing bubbles in a drip adhesive shown in FIG. 7.
Figure 12:
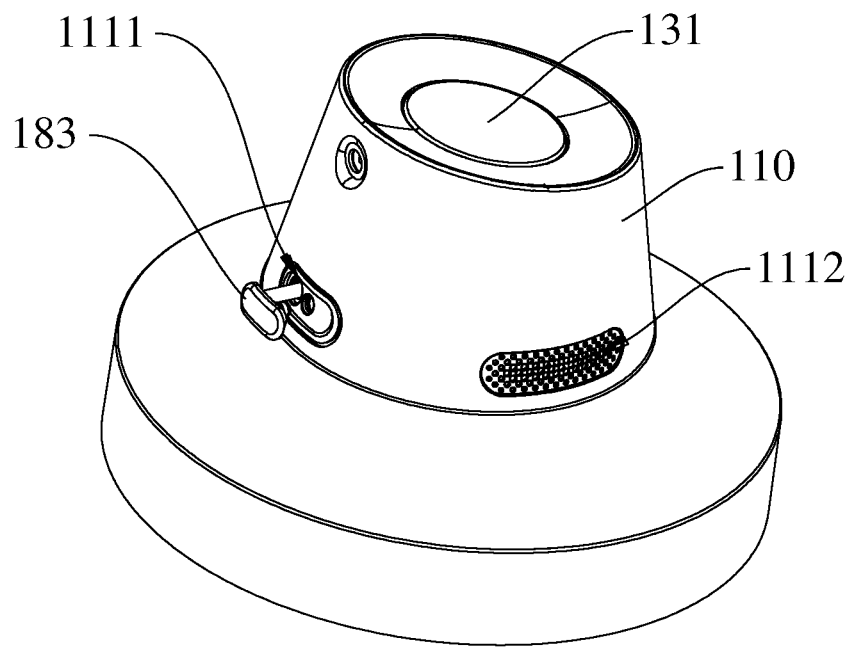
FIG. 12 is a schematic diagram of opening an air relief hole by a pressure relief valve in the device for removing bubbles in a drip adhesive shown in FIG. 7.

As shown in FIG. 8 to FIG. 10, in this embodiment, the control module 130 includes a button 131 and a control circuit board 132; the main machine 100 further includes a fourth shock absorbing element 174; the button 131 is movably connected to the top of the housing 110; the control circuit board 132 is fixedly connected to the housing 110 by screws and electrically connected to the vacuum generator 120; when a part of the button 131 is in a pressed state, the pressed part of the button 131 is in contact with the control circuit board 132; and a top surface and a bottom surface of the fourth shock absorbing element 174 abut against the button 131 and the housing 110 respectively.

In this embodiment, the key 131 includes a press part 1311 and an elastic connection part 1312, where the press part 1311 is connected to one end of the elastic connection part 1312 and is exposed to the top of the housing 110; the elastic connection part 1312 is fixedly connected to the surface housing 111 of the housing 110; and the press part 1311 is configured to move in a direction close to the control circuit board 132 by an external force and is in contact with the control circuit board 132. The fourth shock absorbing element 174 is arranged on a top surface of the elastic connection part 1312 and located between the elastic connection part 1312 and an inner wall of the surface housing 111. The elastic connection part 1312 is fixed to the housing 110 by means of a hot melt process, and the press part 1311 connected to the elastic connection part 1312 is movable relative to the housing 110 under the elastic support of the elastic connection part 1312, such that the button 131 is in the pressed state under the action of an external pressure and restores to its initial state without the external force. In this embodiment, the fourth shock absorbing element 174 is arranged on the elastic connection part 1312, such that the fourth shock absorbing element 174 absorbs the vibration generated by the vacuum generator 120 during operation to reduce abnormal sounds generated when the elastic connection part 1312 collides with the housing 110 due to shake of the vacuum generator 120 during operation, thereby improving the grade of the device for removing bubbles in a drip adhesive, and optimizing the usage experience of the user. The fourth shock absorbing element 174 is made of silica gel.

As shown in FIG. 8 and FIG. 13, in this embodiment, the main machine 100 further includes a fifth shock absorbing element 175 which is located in an interval space between the vacuum generator 120 and an inner wall of the first accommodating cavity 1101, and has two ends connected to a bottom of the vacuum generator 120 and the housing 110 respectively. Specifically, the fifth shock absorbing element 175 is located between the mounting base 122 and the housing 110, and is configured to support the mounting base 122 and absorb vibration energy of the vacuum pump 121 to achieve the shock absorbing effect. The fifth shock absorbing element 175 is a spring.

The device for removing bubbles in a drip adhesive further includes a heating module (not shown in figure) electrically connected to the control module 130; and when the container 200 is connected to the main machine 100, the heating module communicates with the second accommodating cavity 201. The heating module can effectively improve the efficiency of removing the bubbles in the drip adhesive, meet the requirement of the user for removing the bubbles in the drip adhesive in a short time, and ensure that the drip adhesive is kept in an uncured state during bubble removal, such that the bubbles in the drip adhesive are more nearly completely removed.

The heating module may be fixed to the bottom housing 112 provided with a heating channel (not shown in figure). The heating module communicates with the second accommodating cavity through the heating channel, to ensure that when the container 200 is connected to the main machine 100 in a matched manner, the heating module communicates with the second accommodating cavity 201 to heat the drip adhesive in the second accommodating cavity 201.

Alternatively, the heating channel is fixed in the container 200 to heat the drip adhesive.

In this embodiment, the device for removing bubbles in a drip adhesive further includes a drip adhesive stirrer (not shown in figure) which is fixed in the container 200 and implements the integration of stirring and bubble removal of the drip adhesive by the device for removing bubbles in a drip adhesive.

Figure 15:
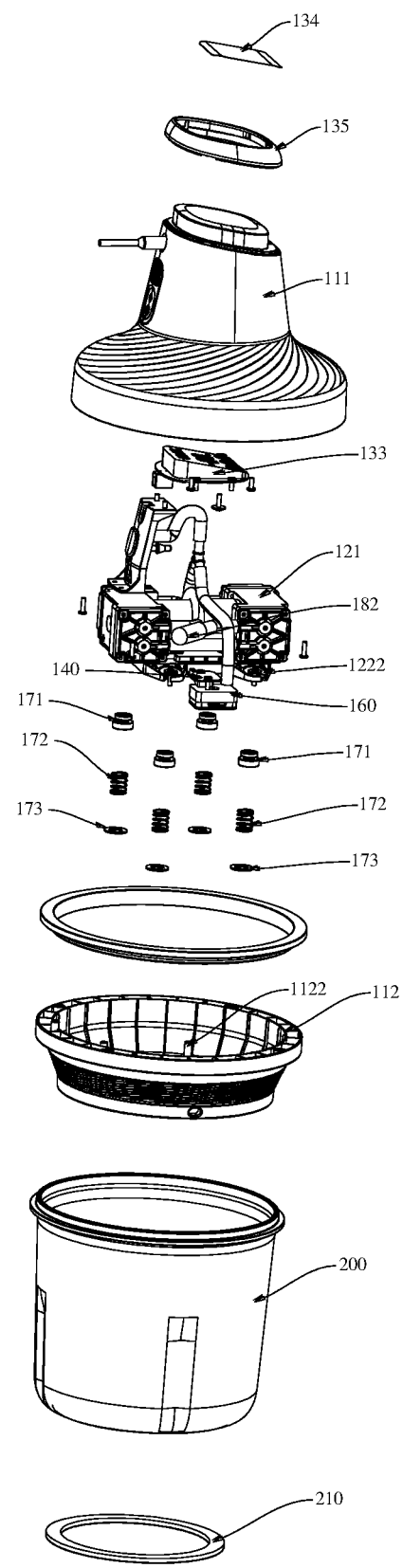
FIG. 15 is an exploded view of a device for removing bubbles in a drip adhesive in Embodiment 3 of the present application.
Figure 16:
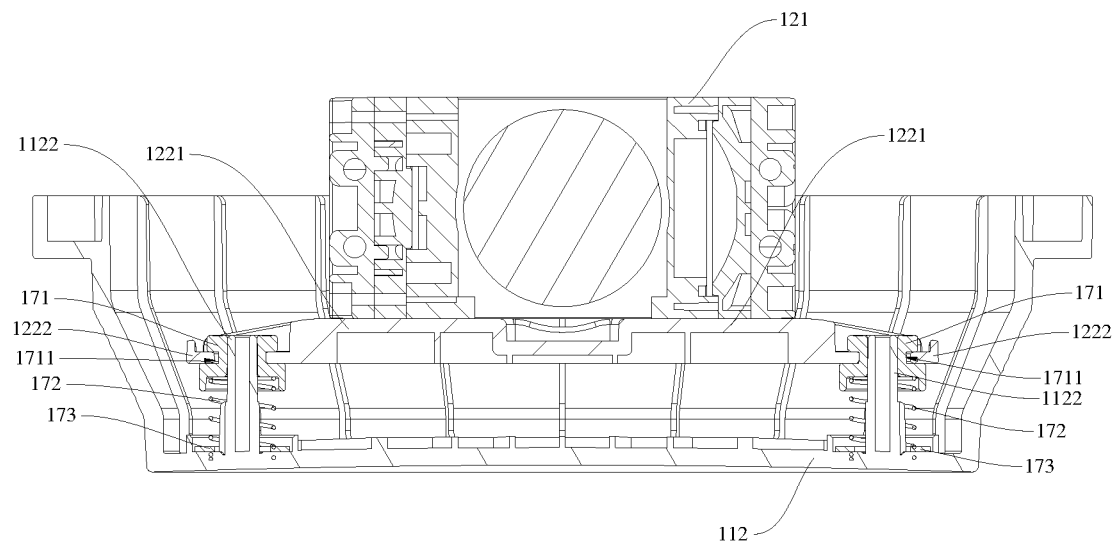
FIG. 16 is a sectional view of a connection relationship among a bottom housing, a vacuum generator, a first shock absorbing element, a second shock absorbing element, and a third shock absorbing element in the device for removing bubbles in a drip adhesive shown in FIG. 15.
Figure 17:
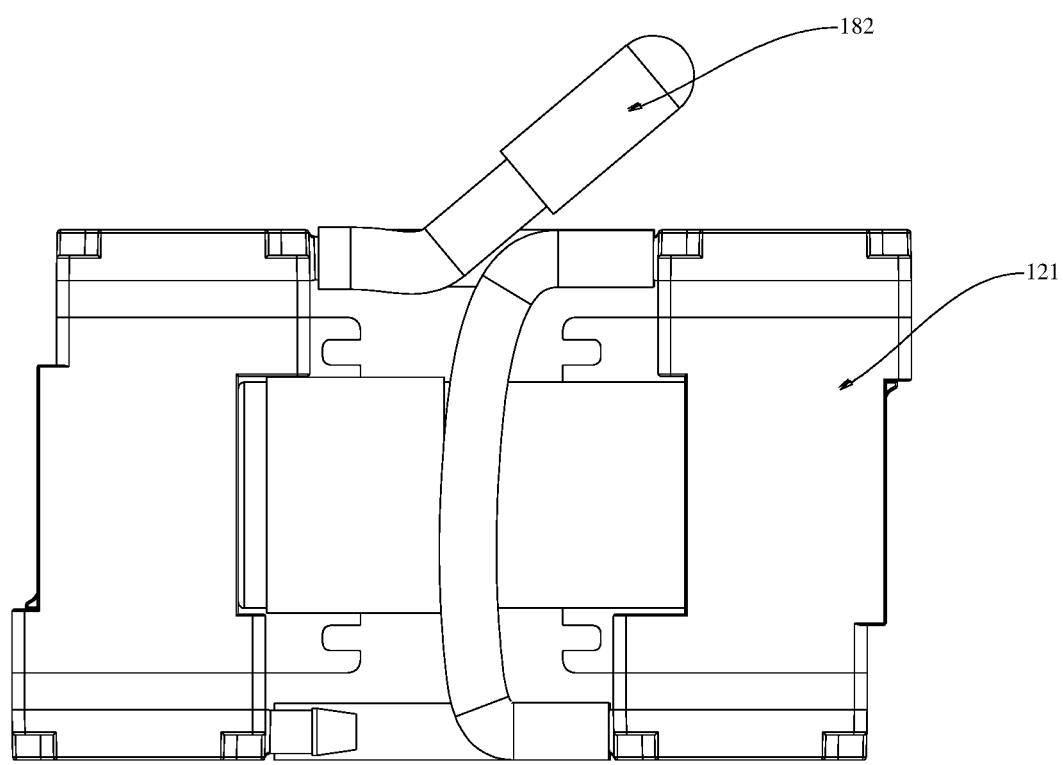
FIG. 17 is a schematic diagram of a vacuum pump in the device for removing bubbles in a drip adhesive shown in FIG. 15.

Embodiment 3 of a device for removing bubbles in a drip adhesive according to the present application As shown in FIG. 15 to FIG. 17, Embodiment 3 is similar to Embodiment 1. Embodiment 3 may be combined with at least one of Embodiment 1 and Embodiment 2. There are the differences between Embodiment 3 and Embodiment 1 below.

As shown in FIG. 15 and FIG. 16, the main machine 100 further includes the second shock absorbing element 172 and a third shock absorbing element 173; the second shock absorbing element 172 is sleeved on a periphery of the mounting post 1122, and has a first end part abutting against the first shock absorbing element 171 and a second end part abutting against a top surface of the third shock absorbing element 173; and a bottom surface of the third shock absorbing element 173 abuts against the bottom housing 112.

In this embodiment, the second shock absorbing element 172 is a spring, and the third shock absorbing element 173 is a silicone gasket. In this embodiment, the third shock absorbing element 173 cooperates with the second shock absorbing element 172 to buffer the vibration of the vacuum generator 120 connected to the first shock absorbing element 171, further absorbs the vibration energy generated by the vacuum generator 120, and can generate a certain support force to the first shock absorbing element 171, such that the first shock absorbing element 171 is prevented from sliding down along the mounting post 1122.

As shown in FIG. 17, in this embodiment, the vacuum pump 121 is a four-head vacuum pump 121 which has a better vacuum effect and can achieve a vacuum degree greater than or equal to −99 Kpa. In this embodiment, the four-head vacuum pump 121 is used to make the bubble removal efficiency of the device higher and the bubble removal effect more ideal.

Alternatively, the vacuum generator 120 includes a plurality of vacuum pumps 121 which are connected in series or in parallel to improve the vacuum effect of the device.

Embodiment 4 of a device for removing bubbles in a drip adhesive according to the present application Embodiment 4 is similar to Embodiment 1. Embodiment 4 may be combined with at least one of Embodiment 1, Embodiment 2, and Embodiment 3. There are the differences between Embodiment 4 and Embodiment 1 below.

In this embodiment, the main machine 100 further includes the second shock absorbing element 172 which is sleeved on the periphery of the mounting post 1122 and has two ends connected to the first shock absorbing element 171 and the bottom housing 112 respectively.

Compared with Embodiment 3, this embodiment is characterized in that the third shock absorbing element 173 is not arranged in the main machine 100, such that the parts inside the main machine 100 can be reduced while the shock absorbing effect is ensured, and the main machine 100 has the better integrity.

Apparently, the embodiments described above are merely some rather than all of the embodiments of the present application, and the preferred embodiments of the present application are given in the accompanying drawings, but do not limit the scope of patent of the present application. The present application may be implemented in many different forms. On the contrary, the objective of providing these embodiments is to provide a more thorough and comprehensive understanding of the content disclosed by the present application. While the present application has been described in detail with reference to the foregoing embodiments, those skilled in the art may still make modifications to the technical solutions described in the foregoing specific embodiments or make equivalent substitutions to some of the technical features therein. Any equivalent structures made using the content of the specification and the accompanying drawings of the present application, directly or indirectly applied in other related technical fields, are similarly included within the scope of patent protection of the present application.

What is claimed is:

1. A device for removing bubbles in a drip adhesive, comprising:
   a main machine, wherein the main machine comprises a housing provided with a first accommodating cavity located inside the housing and an air vent formed in the housing, and a vacuum generator communicating with the air vent and a control module electrically connected to the vacuum generator are accommodated in the first accommodating cavity; and
   a container detachably connected to the main machine, wherein when the container is connected to the main machine, the container and the main machine define a sealed second accommodating cavity which communicates with the vacuum generator through the air vent and is configured to accommodate the drip adhesive to be subjected to bubble removal.

2. The device for removing bubbles in a drip adhesive according to claim 1, wherein the main machine further comprises an air pressure detection module fixed to the first accommodating cavity and electrically connected to the control module; and when the container is connected to the main machine, at least a part of the air pressure detection module communicates with the second accommodating cavity of the container.

3. The device for removing bubbles in a drip adhesive according to claim 2, wherein the housing is provided with a connecting table; the connecting table is located in the first accommodating cavity and provided with a first opening, a second opening, and an air guide cavity communicating with the first opening, the second opening, and the air vent; the first opening communicates with the vacuum generator; the air pressure detection module is fixed to the connecting table and covers the second opening; and the second opening exposes a part of the air pressure detection module to the air guide cavity.

4. The device for removing bubbles in a drip adhesive according to claim 3, wherein a first sealing element is connected to the connecting table and arranged in the second opening, and has a top surface abutting against the air pressure detection module.

5. The device for removing bubbles in a drip adhesive according to claim 3, wherein the main machine further comprises a filtering element located in the air guide cavity between the air vent and the vacuum generator.

6. The device for removing bubbles in a drip adhesive according to claim 1, wherein the main machine further comprises a first shock absorbing element located in the first accommodating cavity and having two opposite side surfaces connected to the vacuum generator and the housing respectively.

7. The device for removing bubbles in a drip adhesive according to claim 6, wherein the housing comprises a surface housing and a bottom housing which are connected to each other and define the first accommodating cavity; the air vent is formed in the bottom housing; when the container is connected to the main machine, the bottom housing and the container define the second accommodating cavity; one surface of the bottom housing that gets close to the first accommodating cavity is provided with a mounting post extending towards the surface housing; the first shock absorbing element is connected to an outer side of the mounting post in a sleeving manner; and a part of the vacuum generator is fixed to an outer side of the first shock absorbing element.

8. The device for removing bubbles in a drip adhesive according to claim 7, wherein an outer side wall of the first shock absorbing element is provided with a clamping slot recessed in a direction close to an inner side wall of the first shock absorbing element; and the part of the vacuum generator that is connected to the outer side of the first shock absorbing element is clamped with the clamping slot.

9. The device for removing bubbles in a drip adhesive according to claim 7, wherein the mounting post is a hollow post; the main machine comprises a positioning screw: at least a part of a screw rod of the positioning screw is in threaded connection with an inner wall of the mounting post; and a bottom surface of a screw cap of the positioning screw abuts against a top surface of the first shock absorbing element.

10. The device for removing bubbles in a drip adhesive according to claim 7, wherein the main machine further comprises a second shock absorbing element sleeved on a periphery of the mounting post and having two ends connected to the first shock absorbing element and the bottom housing respectively.

11. The device for removing bubbles in a drip adhesive according to claim 7, wherein the main machine further comprises the second shock absorbing element and a third shock absorbing element; the second shock absorbing element is sleeved on the periphery of the mounting post, and has a first end part abutting against the first shock absorbing element and a second end part abutting against a top surface of the third shock absorbing element; and a bottom surface of the third shock absorbing element abuts against the bottom housing.

12. The device for removing bubbles in a drip adhesive according to claim 6, wherein the vacuum generator comprises a vacuum pump and a mounting base; the vacuum pump is fixed to the mounting base; the mounting base comprises a mounting base body and at least two mounting rings formed on an outer side of the mounting base body; the vacuum pump is located on the mounting base body; and the mounting rings are clamped on the first shock absorbing element.

13. The device for removing bubbles in a drip adhesive according to claim 12, wherein the main machine further comprises a silencer mounted on the vacuum pump.

14. The device for removing bubbles in a drip adhesive according to claim 12, wherein the housing is provided with an air relief hole communicating with the outside atmosphere and the second accommodating cavity; the main machine further comprises a pressure relief valve separably connected to the housing; and when the air relief hole is in a closed state, the pressure relief valve covers the air relief hole.

15. The device for removing bubbles in a drip adhesive according to claim 14, wherein a first air guide tube and a second air guide tube are connected to the vacuum pump of the vacuum generator and both located in the first accommodating cavity; two ends of the first air guide tube communicate with the vacuum pump and the air vent; and two ends of the second air guide tube communicate with the air relief hole and the first air guide tube.

16. The device for removing bubbles in a drip adhesive according to claim 1, wherein the control module comprises a button and a control circuit board; the main machine further comprises a fourth shock absorbing element; the button is movably connected to a top of the housing; the control circuit board is fixedly connected to the housing by screws and electrically connected to the vacuum generator; when a part of the button is in a pressed state, the pressed part of the button is in contact with the control circuit board; and the fourth shock absorbing element is fixed to the button and located between the button and the housing.

17. The device for removing bubbles in a drip adhesive according to claim 2, wherein the control module comprises a touch display panel and a cover plate; the touch display panel is fixed in the first accommodating cavity; the cover plate is fixed to the top of the housing and located on the touch display panel; and the touch display panel is electrically connected to the vacuum generator and the air pressure detection module.

18. The device for removing bubbles in a drip adhesive according to claim 1, wherein the main machine further comprises a fifth shock absorbing element which is located in an interval space between the vacuum generator and an inner wall of the first accommodating cavity, and has two ends connected to a bottom of the vacuum generator and the housing respectively.

19. The device for removing bubbles in a drip adhesive according to claim 1, further comprising a heating module electrically connected to the control module, wherein when the container is connected to the main machine, the heating module communicates with the second accommodating cavity.

20. The device for removing bubbles in a drip adhesive according to claim 1, wherein a size of the device for removing bubbles in a drip adhesive is smaller than or equal to 0.02 m$^3$.

* * * * *